United States Patent [19]
Campbell

[11] Patent Number: 5,376,220
[45] Date of Patent: Dec. 27, 1994

[54] THERMOPLASTIC TAPE COMPACTION DEVICE

[75] Inventor: Vincent W. Campbell, Oak Ridge, Tenn.

[73] Assignee: Martin Marietta Energy System, Inc., Oak Ridge, Tenn.

[21] Appl. No.: 21,876

[22] Filed: Feb. 24, 1993

[51] Int. Cl.⁵ .................. B65B 51/18; B31B 31/04
[52] U.S. Cl. .................. 156/581; 156/583.3; 156/583.5; 156/582; 156/499; 100/151; 100/171; 100/295
[58] Field of Search .................. 156/581, 582, 583.1, 156/583.5, 583.3, 497, 498, 499, 282; 100/93 RP, 171, 295, 151

[56] References Cited

U.S. PATENT DOCUMENTS

| | | | |
|---|---|---|---|
| 2,071,999 | 2/1937 | Dike | 100/93 RP |
| 2,675,053 | 4/1954 | Clemens | 156/583.5 X |
| 2,975,470 | 3/1961 | Snelson | 425/151 X |
| 3,126,306 | 3/1964 | Sherman | 156/497 X |
| 3,570,341 | 3/1971 | Abbott | 100/295 X |
| 3,645,198 | 2/1972 | Field | 100/151 X |
| 3,676,265 | 7/1972 | Edwards | 100/151 X |
| 3,723,230 | 3/1973 | Troutner | 100/151 X |
| 3,779,843 | 12/1973 | Knapp | 156/282 X |
| 3,878,027 | 4/1975 | Troutner | 100/151 X |
| 3,883,284 | 5/1975 | De Mets | 100/151 X |
| 3,896,918 | 10/1976 | Berner | 156/497 X |
| 3,933,563 | 1/1976 | Carcisle | 156/582 X |
| 3,948,718 | 4/1976 | Mosberger | 156/582 X |
| 4,080,241 | 3/1978 | Greuich | 100/151 X |
| 4,216,638 | 8/1980 | Yoshida | 156/583.3 X |
| 4,260,447 | 4/1981 | Muscariello | 156/498 X |
| 4,755,252 | 7/1988 | Held | 100/93 X |
| 4,824,354 | 4/1989 | Keaton | 156/583.5 X |
| 4,994,138 | 2/1991 | Prinoda | 100/151 X |
| 5,078,821 | 1/1992 | Garvey et al. | 156/282 |
| 5,145,548 | 9/1992 | Yamamoto | 100/151 X |

Primary Examiner—David A. Simmons
Assistant Examiner—Charles Rainwater
Attorney, Agent, or Firm—Jeffrey N. Cutler; Joseph A. Marasco; Harold W. Adams

[57] ABSTRACT

A device for bonding a thermoplastic tape to a substrate to form a fully consolidated composite. This device has an endless chain associated with a frame so as to rotate in a plane that is perpendicular to a long dimension of the tape, the chain having pivotally connected chain links with each of the links carrying a flexible foot member that extends outwardly from the chain. A selected number of the foot members contact the tape, after the heating thereof, to cause the heated tape to bond to the substrate. The foot members are each a thin band of metal oriented transversely to the chain, with a flexibility and width and length to contact the tape so as to cause the tape to conform to the substrate to achieve consolidation of the tape and the substrate. A biased leaf-type spring within the frame bears against an inner surface of the chain to provide the compliant pressure necessary to bond the tape to the substrate. The chain is supported by sprockets on shafts rotatably supported in the frame and, in one embodiment, one of the shafts has a drive unit to produce rotation such that the foot members in contact with the tape move at the same speed as the tape. Cooling jets are positioned along the frame to cool the resultant consolidated composite.

19 Claims, 2 Drawing Sheets

THERMOPLASTIC TAPE COMPACTION DEVICE

The U.S. Government has rights in this invention pursuant to Contract No. DE-AC05-84OR21400 awarded by U.S. Department of Energy Contract with Martin Marietta Energy Systems, Inc., and pursuant to DOE Project No. 2008-D026-A1 under U.S. Air Force MIPR No. FY1133-90-5075.

TECHNICAL FIELD

This invention relates to the production of multilayered composites of materials that exhibit thermoplastic properties, and more particularly to an apparatus that is useful for the production of fully consolidated thermoplastic composites. Further, the device can be used to "tack" a thermoplastic tape in position for further processing. The device does not require an autoclave such that the composites can be produced "on site" if desired. The apparatus provides for the necessary heat and pressure delivered over a sufficient time such that the composites can be produced having a complex contour and full consolidation.

BACKGROUND ART

A large number of objects are currently produced from thermoplastic materials, from toys to various types of vehicle components including those for aircraft and space craft, for example. While some of these objects require only a single layer of the plastic, many (particularly those of vehicles) involve multiple layers so as to form a "composite". Often these layers of plastic will include a strengthening material in the form of reinforcing fibers. In the field of spacecraft part fabrication, the plastic is frequently in the form of thin layers of a polyether ether ketone (PEEK) containing carbon fibers, where the fibers are present at about 60% by volume. These layers, referred to as a "prepreg", are typically formed using a tape about 0.005 in. thick, and commercially-available tapes of this material having a width up to about thirty-six inches are available from several sources, including Amoco Chemical company.

It is common prior art practice for the forming of the composites to place one or more layers of the thermoplastic sheet over a die of the desired configuration. This assembly is placed in a bag, which is evacuated, and then in an autoclave where it is heated (typically 700°-800° F.) under pressure (typically 100-200 psi) for a time selected for a particular application. Under these conditions the thermoplastic conforms to the shape of the die. The composite can then be cooled and removed from the autoclave. There is essentially no restriction on the contour of the part.

It can be seen, however, that this forming method is limited to parts having a size and shape that can be processed within an autoclave. When larger components are to be produced, or when a repair to a previously-prepared composite is to be made, other methods are required.

Several devices have been developed to achieve this non-autoclave compaction of thermoplastic tape. The simplest form of a device of this character is a roller that subjects the elements for the consolidation to pressure immediately after the application of heat thereto. A modification of this is the compliant roller described in U.S. Pat. No. 5,078,821 issued on Jan. 7, 1992. This device, while applying a line of pressure, fails to provide the pressure over a significant area.

Other devices conceived for this consolidation include a unit employing a plurality of spring-loaded rollers that are part of a continuous chain. These rollers, again, provide pressure along a given line and have no flexibility across their own length. The same is true of a "silent chain" that is similar to a interior toothed belt that does not move relative to the composite structure. Still another device is a "stomper" wherein individual spring-loaded feet apply pressure. Since this latter device has to be lifted from the surface in order to achieve relative motion with respect to the object, unequal pressures can be applied that result in regions of insufficient consolidation.

Accordingly, it is an object of the present invention to provide a device that achieves sufficient flow of thermoplastic materials during the heating thereof such that full consolidation of multiple layers is achieved.

It is another object of the present invention to provide a device that moves relative to an object to be consolidated, with that device providing pressure over a significant area but with sufficient flexibility so as to form components having curved contours.

These and other objects of the present invention will become apparent upon a consideration of the drawings that follow together with a complete description thereof.

DISCLOSURE OF THE INVENTION

In accordance with the present invention, an apparatus is provided for preparing fully consolidated composites of multiple plies of materials exhibiting thermoplastic properties. Specifically, it is described with regard to the formation of such composites through the thermal/pressure bonding of thin fiber-reinforced plastic tapes or sheets. The apparatus is applicable to being moved relative to the structure being formed and provides for the heating of the materials to melting temperature, applying sufficient pressure over an area for a time sufficient to cause flow of the material, and then cooling the product. There is sufficient flexibility of elements contacting the object such that the object can have various surface configurations. This apparatus can thus be used to form composites that conform to irregular and complex surfaces and achieve complete consolidation. Although developed specifically for producing composites of fiber-reinforced thermoplastic films, the apparatus is applicable to other materials that exhibit thermoplastic properties.

BEST MODE FOR CARRYING OUT THE INVENTION

Figure 1:
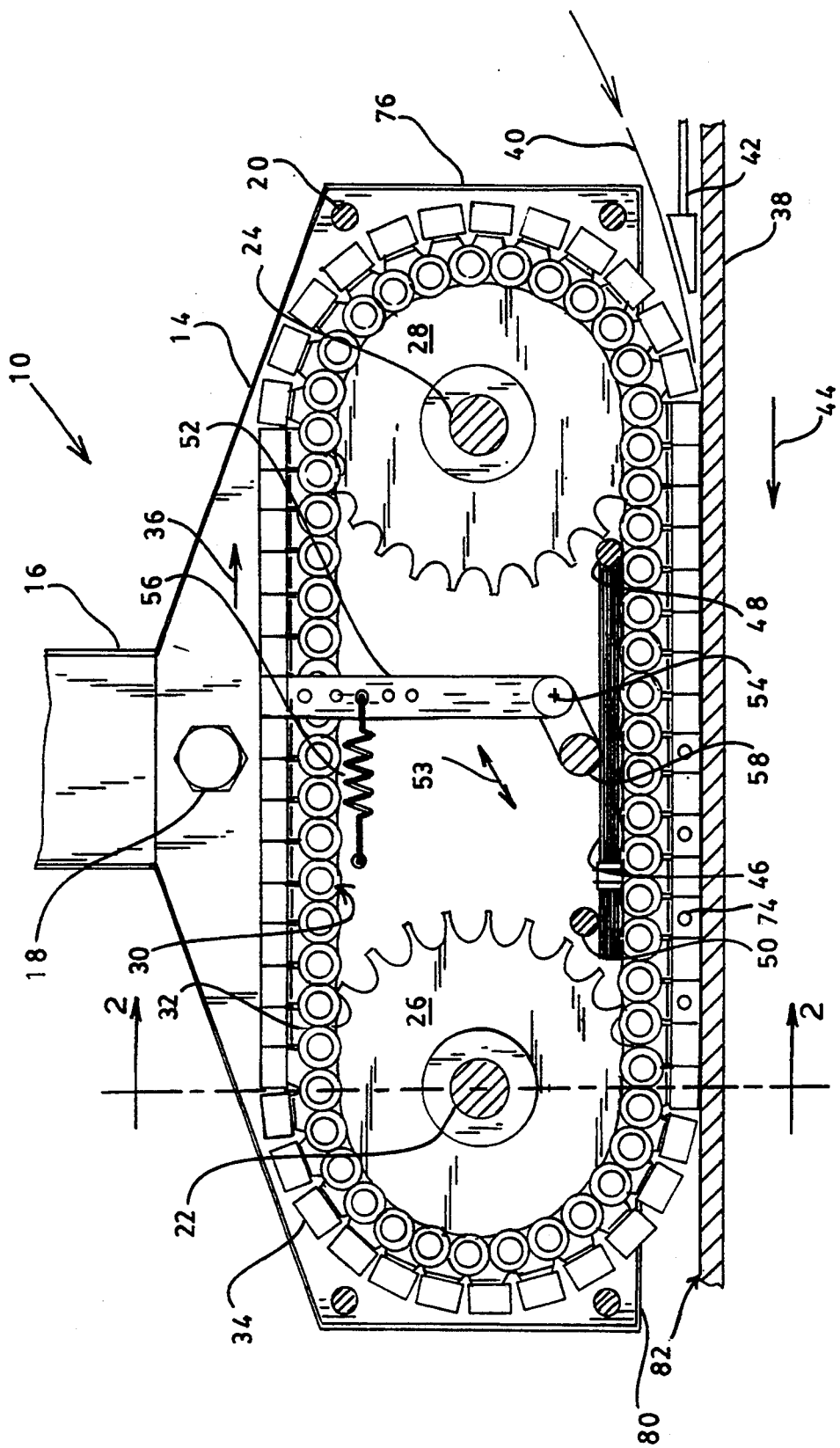
FIG. 1 is a schematic drawing of an embodiment of the present invention that gives rise to full consolidation of composites even upon irregular surfaces and surfaces of complex geometries. One support plate of the frame portion is removed to better illustrate interior components.
Figure 2:
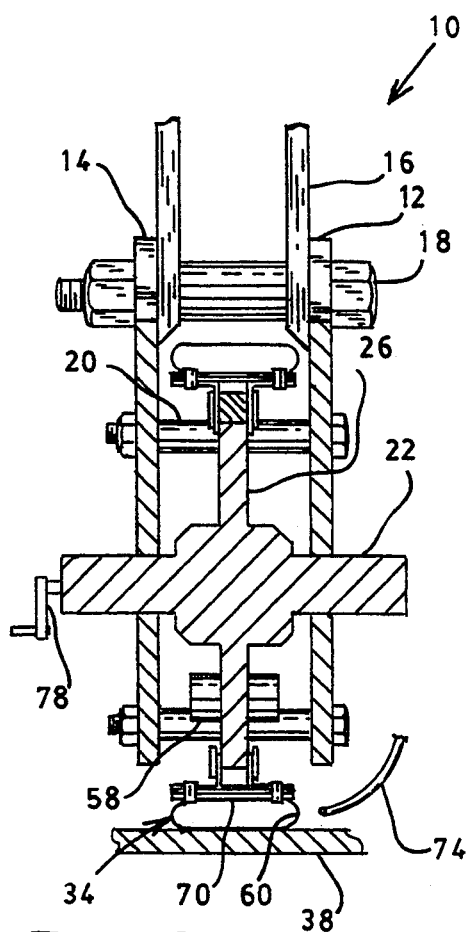
FIG. 2 is a cross-section of the apparatus of the embodiment of FIG. 1 taken at 2—2 thereof, but with both support plates in place.

The present invention can best be understood by referring to FIGS. 1 and 2 where it is indicated generally at 10. In this connection, FIG. 1 illustrates the invention 10 with one support plate removed, and FIG. 2 is a cross sectional illustration taken through one of the shafts thereof. As indicated, the device 10 has two substantially parallel and vertical support plates 12, 14. These support plates 12, 14 are typically attached to a main support member 16 as with a bolt 18 or other secure fastener. Further, the plates 12, 14 are typically held in their parallel relationship with spacer rods 20 or like elements. These elements are considered to be the "frame" of the device 10; however, it will be recognized that the frame could have other components and/or configurations.

A pair of shafts 22, 24 are mounted in appropriate bearings (not shown) in the support plates 12, 14 and are transverse to the gap between the plates 12, 14. These shafts 22, 24, respectively, support sprockets 26, 28 attached thereto. Engaged with the sprockets 26, 28 is an endless chain member 30. This chain member 30 is made up of links 32, with each link having an outwardly-directed "foot" member 34 that is discussed in detail hereinafter. Accordingly, as the chain member 30 moves, as in a direction indicated by the arrow 36, the feet members 34 also move in that direction.

The device 10 is shown in FIGS. 1 and 2 as being substantially in contact with a substrate 38 of the element that is to be consolidated with a tape (a "tow") 40 of a thermoplastic tape. Although the device be is shown as being above the substrate, any orientation is possible such that the device is proximate the substrate 38. This tape 40 is typically fed from a spool (not shown) carried by the device 10 or by some source that is substantially fixed in position with the device 10. Further, the tape 40 is heated to approximately the melting point through the application of heat from a heat source typically a hot air source. Typically more than one heat source 42 is utilized to assure uniform heating across the width of the tape 40. Of course, it will be understood that other heat sources can be used, including infrared lamps, induction or resistance heaters or the like. The heat preferably is applied to both sides of the tape 40 although only single-sided heating is illustrated in FIG. 1.

The substrate 38 is caused to move relative to the device 10 in a direction indicated by the arrow 44. This relative motion is caused by movement of the substrate 38, by movement of the device 10, or by movement of both in opposite directions. During this relative movement the feet members 34 are pressed against the tape 40 to achieve compaction of the same onto the substrate 38. This pressure is derived from two sources. One source is compliant pressure that is applied against the chain member 30. This is created through the use of a multi-layered "snake" 46, mounted between the support plates 12, 14, which is pivoted at 48 and rests against a stop 50. This snake 46, which is similar to a leaf-type spring, is kept in firm contact with the chain member 30, as the chain member 30 moves across the snake 46, through the use of a biased lever unit 52 that pivots in a direction indicated by the double-ended arrow 53 at 54. The biasing of the lever unit 52 is provided with a spring member 56 or like device such that a rider 58 presses against the snake 46 at all times; however, the snake 46 can move vertically at the point of contact with the rider 58 depending upon any vertical movement of the chain member 30 at that point. The position of attachment of the spring member 56 is selectable to achieve a selected pressure of the rider 58 against the snake 46.

Figure 3:
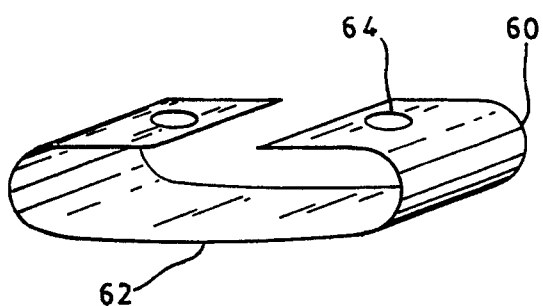
FIG. 3 is a perspective drawing illustrating a spring-type foot unit as used with the apparatus of FIG. 1.

The second source of compliance is derived from the feet members 34 attached to the chain links 32. The construction of these members 34 is more clearly illustrated in FIGS. 2-4. Each of the feet 34 is made up of a thin metallic member 60, typically 0.032 in. Inconel X-750, that is about 0.75 in. wide and bent so that the dimension transverse to a direction of travel is about 2.25 in. (when the thermoplastic tape has a width of 1.5 in.). This transverse dimension is preferable slightly greater than the width of the thermoplastic tape 40 that is to be consolidated onto the substrate 38. The height of the metallic member 60 after forming is typically 0.50 in. A portion to be in contact with the tape 40 is generally flat; however, it is preferred to have an outward bow in a central portion 62 of about 0.03 in. The bent ends that are directed toward one another are each provided with an aperture 64 of about 0.25 in. so as to accept fasteners 66 that pass through the member 60 to fasten the same to a conventional hanger 68 attached to the chain links 32. Typically there are thermal break elements (insulation) 70 interposed between the member 60 and the hanger 68. This construction minimizes heat transfer from the feet members 34 into the chain 30.

In some applications, the feet members of the device need to accommodate a wider path. An embodiment thereof is illustrated at 34' in FIG. 5. In this construction the metallic member 60' is lengthened, with the width and height adjusted to match the specific application. A small central outward bow at 62' is provided. In order that the member 60' does not deform too readily, some form of "spring" member supports the central portion. In the embodiment illustrated, this spring member is provided in the form of a second metallic member 72 that is similar in construction of the aforementioned member 60 of FIGS. 2-4. Both member 60' and member 72 are fastened to the hanger with fasteners 66 as in FIG. 4. As in the other embodiment, thermal break members (insulation) 70' reduce heat transfer into the chain drive 30 through the support hanger 68'. It will be recognized that other types of spring members that provide the same function as that of member 72 can be utilized in this embodiment.

As in other consolidation apparatus, it is desirable to cool the consolidated product after sufficient pressure has been applied during and immediately after heating of the materials being joined. In the present device this cooling is provided by a plurality of air jets 74 that are directed as indicated in FIG. 2. The spacing of the jets 74 along the device be are indicated in FIG. 1. Although four jets 74 are indicated, more or less can be used depending upon the degree of cooling that is desired.

Figure 4:
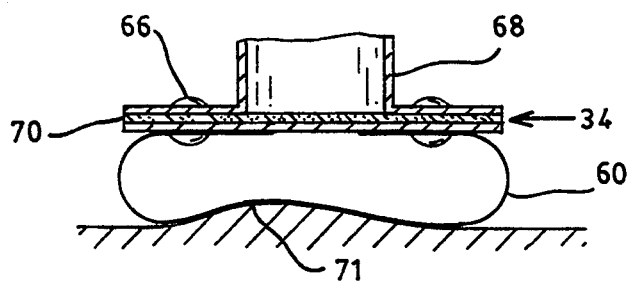
FIG. 4 is a drawing illustrating deformation of a foot unit, such as illustrated in FIG. 3, caused by a change in contour of the substrate of the object beneath the foot.
Figure 5:
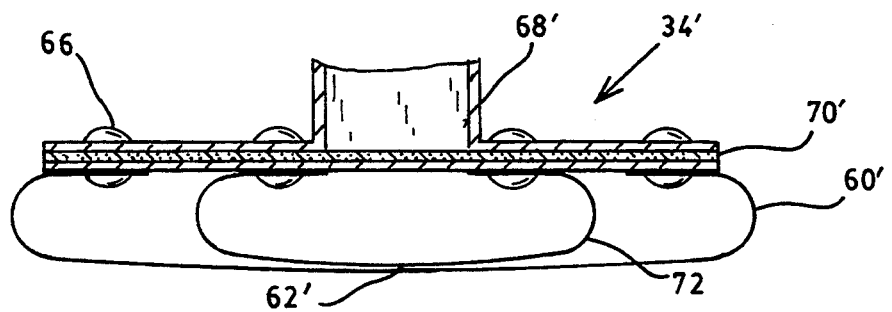
FIG. 5 is a drawing illustrating one embodiment of an extended-width foot unit for use in a device such as in FIG. 1 wherein the transverse dimension across the device is increased.

The member 60 is made very thin (e.g., 0.032 in.) so as to be easily deformed. This characteristic is illustrated in FIG. 4. Thus, if the substrate 38 has an elevated portion at 71, the member 60 deforms accordingly so that uniform pressure is applied to ensure complete consolidation of the product.

In a typical utilization of the present device 10, it is mounted from a suitable support (not shown) using the main support 16 so as to be in a fixed position. The substrate 38 is moved beneath the device 10 by any suitable apparatus, such as a linearly-movable table (not shown). The free end of a thermoplastic tape 40 is fed beneath the "forward" end of the device 10 at 76 (see FIG. 1) whereupon heating of the tape 40 and the substrate 38 is commenced using the heat source 42. The substrate 38 and the tape 40 are moved in the direction indicated by the arrow 44. Since the joint effect of the lever unit 52 and the feet members 34 provide pressure with compliance upon the tape 40, the chain member 30 is caused to rotate on the sprockets 26, 28 and move in the direction indicated by the arrow 36. At the same time adequate pressure is being applied to cause consolidation of the tape 40 with the substrate 38. If gaps between adjacent feet cause undesirable consolidation problems, a thin (0.010 in.) spring steel shim can be fed onto the top of the tape during movement beneath the present device.

In order to insure that no slippage occurs between the feet members 34 and the heated tape 40, it may be desirable to cause one of the shafts 22, 24 to rotate due to some drive means 76. This is indicated by the crankshaft handle in FIG. 2 as being one form of drive means 76 attached to shaft 22. The torque for this rotation can be applied via hydraulic drive, pneumatic drive, electric motor, etc. It will be recognized that the second shaft 24 need not have separate drive means.

As set forth above, since the tape 40 and the substrate 38 are heated to a melting point, the pressure applied through the feet members 34 produce a hot but consolidated product. To ensure a continuing bond, this hot product moves past the cooling jets 74 causing the temperature to be lowered to below the melting point of the components of the product. The number and temperature of air jets 74 are chosen to give the desired rate of cooling and the final temperature of the composite product 82 leaving the device at a "rearward" end 80.

The device as described herein has been tested for the consolidation of a 1.5 in. wide thermoplastic tape to a substrate. Substantial consolidation was achieved with the test model.

Although this operation has been described with the device be in a fixed position, it will be understood that in some applications the substrate 38 will be in a fixed position. For such applications, the device be and a feeder for the tape 40 will be moved. Such application is that for repairing an area on a large object. Of course, both the device 10 and the substrate 38 could be moved. In any of these types of operation, the device 10 will be lifted (by any suitable apparatus) relative to the substrate 38 (or the consolidated product) at the end of a stroke so as to reposition the components for the next stroke. Of course, there may be applications where the substrate 38 is substantially a continuously moving object and, for such applications, the device 10 will not need to be raised until all joining is complete.

In addition, it will be recognized by persons skilled in the art that the size of the device be is selected for optimum consolidation of a object of a given size and shape, and a tape of a selected width.

In the formation of a given product, certain standard consolidation techniques can be utilized with the present device 10. For example, when applying a first layer to an object that is in itself not thermoplastic, an "adhesive" that exhibits thermoplastic properties can be first applied to the object. Thereafter the thermoplastic tape (tow) 40 can be applied as described above. Further, it will be understood that the tape 40 can be preheated to a temperature below the melting temperature but above the crystallization temperature. It is then heated to the melting temperature just prior to the application of pressure. The temperatures will be selected for the particular materials that are to be joined.

From the foregoing, it will be understood by persons skilled in the art that an improved device has been developed whereby heat and pressure can be maintained for a time sufficient to achieve complete consolidation with materials that exhibit thermoplastic properties. The pressure is applied against individual and sufficiently small areas such that the substrate can have an uneven surface and yet achieve full consolidation. While certain dimensions are given hereinabove, these are not given to limit the invention. Rather, the invention is to be limited only by the appended claims or their equivalents when read with the entire description of the invention.

We claim:

1. A device for bonding a thermoplastic tape to a substrate having a complex contour to form a fully consolidated composite of said tape and said substrate, said device comprising:

a frame for positioning proximate said substrate and for being moved relative to said substrate;

an endless chain mounted from said frame, said endless chain having a plurality of pivotally-joined chain links and being engaged with first and second sprockets rotatably mounted on first and second shafts within said frame, said sprockets rotatable in a plane substantially perpendicular to a plane of said tape;

a plurality of flexible foot members fabricated from a material to withstand a temperature required for forming the consolidated composite, each of said foot members attached to one of said plurality of chain links, each of said flexible foot members having a width in a direction along said tape and a length transverse to a direction along said tape, said length being at least equal to a transverse width of said tape, each of said foot members being flexible both across said width and along said length to conform to the complex contour of said substrate, each said foot member formed from a band of material into an elongated C-shaped body with ends disposed toward each other, and having a central portion directed toward said tape having an outwardly-directed bow to facilitate flexibility toward said tape, said ends being attached to a hanger portion of said one of said plurality of chain links;

means for placing said tape so as to be interposed between said substrate and selected of said foot members directed toward said substrate, said tape oriented to have a length aligned with said chain;

a heat source for directing heat against said tape adjacent said position of being interposed between said substrate and selected of said foot member directed toward said substrate to heat said tape to a temperature for full consolidation with said substrate;

pressure applying means in contact with selected of said chain links directed toward said substrate whereby said selected foot members attached to said selected of said chain links and directed toward said substrate apply pressure against said tape heated by said heat source to fully consolidate said tape with said substrate; and drive means for moving said frame relative to said substrate whereby said plurality of foot members apply pressure to said heated tape to create the fully consolidated composite of said tape and said substrate, the composite having a contour corresponding to the contour of said substrate.

2. The device of claim 1 wherein said frame is stationary and said drive means moves said substrate past said frame.

3. The device of claim 1 wherein each said foot members is a band of flexible metallic stock.

4. The device of claim 3 wherein said ends of said foot members are separated from said hanger of said chain links with thermal insulation material to reduce heat transfer from said foot members to said chain.

5. The device of claim 1 further comprising jets for directing a cooling medium against a portion of said foot members directed toward said tape and said substrate at a position intermediate a central portion and a trailing edge of said frame.

6. The device of claim 1 wherein said pressure applying means comprises:
   a leaf-type spring unit within said frame in contact with a portion of said chain directed toward said substrate, said spring unit having a first end pivotally attached to said frame, and a second end;
   a lever within said frame and pivotally attached thereto, said lever having a rider in contact with said spring unit intermediate said first end and said second end; and
   a biasing means attached to said lever for maintaining pressure of said rider against said spring unit whereby pressure is applied to said selected of said foot members directed toward said substrate as said chain moves relative to said frame.

7. The device of claim 1 wherein one of said first and second shafts is connected to a unit for rotating said shaft whereby said selected of said foot members directed toward said substrate move at a speed equal to a speed of said frame relative to said substrate.

8. The device of claim 1 further comprising a spring means positioned within each of said foot members at said central portion of said elongated C-shaped body to maintain said central portion of said foot members against said tape upon said substrate.

9. The device of claim 6 wherein said biasing means attached to said lever is a coil spring having a first end attached to said frame and a second end attached to a selected position along said lever, said selected position selected to achieve a selected pressure of said rider against said leaf-type spring.

10. A device for bonding a thermoplastic tape to a substrate to form a fully consolidated composite, said device comprising:
    a frame for positioning proximate said substrate and for being moved relative to said substrate;
    an endless chain mounted from said frame, said endless chain having a plurality of pivotally-joined chain links and being engaged with first and second sprockets rotatably mounted on first and second shafts within said frame, said sprockets rotatable in a plane substantially perpendicular to a plane of said tape;
    a plurality of flexible foot members, one of said foot members attached to each of said plurality of chain links, each of said foot members being a band of flexible metallic stock having a width in a direction parallel to a length of said tape and a length transverse to said length of said tape, said band being formed into an elongated C-shaped body with ends disposed toward each other and having a central portion directed toward said tape provided with an outwardly-directed bow to facilitate flexibility toward said tape, said ends being attached to a hanger portion of each of said chain links a length transverse to a direction along said tape, said foot member having a length transverse to said chain at least equal to a transverse width of said tape, each of said foot members being flexible both across said width and along said length;
    means for placing said tape so as to be interposed between said substrate and selected of said foot members directed toward said substrate and oriented to have a length aligned with said chain;
    a heat source for directing heat against opposite surfaces of said tape adjacent said position of being interposed between said substrate and selected of said foot members directed toward said substrate, said heat source to raise said tape to a melting temperature;
    pressure applying means in contact with selected of said chain links directed toward said substrate whereby said selected foot members directed toward said substrate apply pressure against said tape heated by said heat source to fully consolidate said tape with said substrate, said pressure applying means including
    a) a leaf-type spring unit within said frame in contact with a portion of said chain directed toward said substrate, said spring unit having a first end pivotally attached to said frame, and a second end,
    b) a lever within said frame and pivotally attached thereto, said lever having a rider in contact with said spring unit intermediate said first end and said second end, and
    c) a biasing means attached to said lever for maintaining pressure of said rider against said spring unit whereby pressure is applied to said selected of said foot members directed toward said substrate as said substrate is moved relative to said frame; and
    d) drive means for moving said frame relative to said substrate whereby said plurality of foot members apply pressure to said heated tape to create a fully consolidated composite of said tape and said substrate.

11. The device of claim 10 wherein said frame is stationary and said drive means moves said substrate past said frame.

12. The device of claim 10 wherein said ends of said foot members are separated from said hanger of said chain links with thermal insulation material to reduce heat transfer from said foot members to said chain.

13. The device of claim 10 further comprising jets for directing a cooling medium against a portion of said foot members directed toward said tape and said substrate at a position intermediate a central portion and a trailing edge of said frame.

14. The device of claim 10 wherein one of said first and second shafts is connected to a unit for rotating said shaft whereby said selected of said foot members directed toward said substrate move at a speed equal to a speed of said frame relative to said substrate.

15. The device of claim 10 further comprising a spring means positioned within each of said foot members at said central portion of said elongated C-shaped body to maintain said central portion of said foot members against said tape upon said substrate.

16. The device of claim 10 wherein said biasing means attached to said lever is a coil spring having a first end attached to said frame and a second end attached to a selected position along said lever, said selected position selected to achieve a selected pressure of said rider against said leaf-type spring.

17. A device for bonding a thermoplastic tape to a substrate to form a fully consolidated composite, said device comprising:

a frame for positioning proximate said substrate and for being moved relative to said substrate;

an endless chain mounted from said frame, said endless chain having a plurality of pivotally-joined chain links and being engaged with first and second sprockets rotatably mounted on first and second shafts within said frame, said sprockets rotatable in a plane substantially perpendicular to a plane of said tape;

a plurality of flexible foot members fabricated from a band of flexible metallic stock, said band being formed into an elongated C-shaped body with ends disposed toward each other and having a central portion directed toward said tape, said central portion provided with an outwardly-directed bow to facilitate flexibility toward said tape, said ends being attached to a hanger portion of one of said chain links, said foot members having a width in a direction along said tape and a length transverse to a direction along said taper, said length being at least equal to a transverse width of said taper each of said foot members being flexible both across said width and along said length;

means for placing said tape so as to be interposed between said substrate and selected of said foot members directed toward said substrate, said tape oriented to have a length aligned with said chain;

a heat source for directing heat against said tape adjacent said position of being interposed between said substrate and selected of said foot members directed toward said substrate;

pressure applying means in contact with selected of said chain links directed toward said substrate whereby said selected foot members directed toward said substrate apply pressure against said tape heated by said heat source to fully consolidate said tape with said substrate; and drive means for moving said frame relative to said substrate whereby said plurality of foot members apply pressure to said heated tape to create the fully consolidated composite of said tape and said substrate.

18. The device of claim 17 wherein said pressure applying means comprises:

a leaf-type spring unit within said frame in contact with a portion of said chain directed toward said substrate, said spring unit having a first end and a second end, said first end pivotally attached to said frame;

a lever within said frame and pivotally attached thereto, said lever having a rider in contact with said spring unit intermediate said first end and said second end; and a biasing means attached to said lever for maintaining pressure of said rider against said spring unit whereby pressure is applied to said selected of said foot members directed toward said substrate by said spring unit as said chain moves relative to said frame.

19. The device of claim 17 further comprising a spring means positioned within each of said foot members at said central portion of said elongated C-shaped body to maintain said central portion of said foot members against said tape upon said substrate.

* * * * *